INVENTOR
ROBERT C. MacARTHUR.
BY
ATTORNEY ved Feb. 3, 1970

United States Patent Office 3,493,485
Patented Feb. 3, 1970

3,493,485
APPARATUS FOR DETERMINING DISSOLVED OXYGEN CONCENTRATION OF BIOLOGICAL FLUIDS
Robert C. MacArthur, Bowmansville, N.Y., assignor to Cornell Aeronautical Laboratory, Inc., Buffalo, N.Y., a corporation of New York
Filed Oct. 25, 1967, Ser. No. 678,005
Int. Cl. B01k 3/00
U.S. Cl. 204—195          8 Claims

ABSTRACT OF THE DISCLOSURE

Apparatus for determining concentration of oxygen dissolved in biological fluids, according to polarographic techniques, utilizing catheter-like microelectrodes incapsulated by a film of hydrophobic material and applying thereto a train of voltage pulses of progressively increasing or decreasing amplitude to obtain a characteristic concentration curve.

BACKGROUND OF THE INVENTION

The present invention relates to apparatus for determining the concentration of certain substances by the employment of polarographic techniques.

Microelectrodes are known in the form of catheter-like probes that may be applied directly to body fluids for determining the oxygen content thereof; the information obtained thereby can be useful for the diagnosis of many diseases, particularly, cancer. Typically, these microelectrodes might include an incapsulating film of a hydrophobic material which functions to permit only the transportation of gases therethrough by a diffusion process. In this manner, the transportation of protein, which can contaminate the electrodes, is effectively blocked.

As is well known, polarography pertains to the qualitative and quantative analysis of substances in solution and usually comprises apparatus for applying an increasing voltage to a pair of electrodes in the solution and measuring the resulting current. The limiting current thus measured at a certain voltage is a function of the concentration of a substance of interest in solution.

Difficulty has been experienced with existing apparatus employing microelectrodes. Whereas the film enveloping the electrodes prevents the transportation of protein, the quantity of oxygen that passes therethrough increases with the progressively greater applied voltages. Thus, in addition to the consumption of an undesirably large proportion of oxygen from the body fluid, the rate of consumption within the immediate vicinity of the electrodes greatly exceeds the rate of diffusion through the film; this prevents the maintenance of an equilibrium condition across the film, which is required for accurate concentration measurements.

SUMMARY OF THE INVENTION

The foregoing and other difficulties are overcome according to the present invention by the provision of an apparatus that permits a balance to be maintained across the hydrophobic film which also avoids the excessive consumption of oxygen from the biological fluids.

Basically the apparatus according to the present invention comprises; microelectrode means, a film of hydrophobic material incapsulating said microelectrode means, a pulse generating means, and means applying the output of said pulse generating means to said microelectrode means.

It has been found that when short duration pulses of increasing or decreasing amplitude are applied to the electrodes, there is insufficient time for a significant fraction of the dissolved oxygen to be consumed during the pulse-on times, whereas during the relatively longer pulse-off times there is sufficient time for equilibrium to be reestablished by diffusion across the hydrophobic film barrier.

The foregoing, as well as other, advantages of the present invention will become apparent as a detailed description thereof proceeds.

BRIEF DESCRIPTION OF THE DRAWINGS

For a fuller understanding of the invention, reference may be had to the following description taken with the accompanying drawings wherein.

DESCRIPTION OF THE PREFERRED EMBODIMENT

Figure 1:
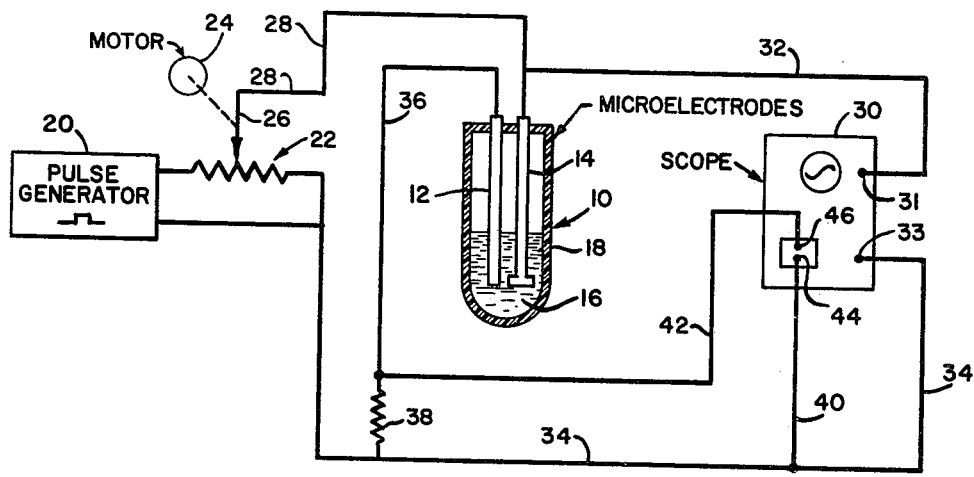
FIGURE 1 is a schematic illustration of the apparatus according to the invention.

Referring now to the drawings, and more particularly, to FIGURE 1, the microelectrodes are depicted generally at 10 and are shown as comprising a polarizable electrode 12 which may be platinum and a larger area unpolarizable electrode 14 that may be silver-silver chloride. Lower portions of electrodes 12 and 14 are immersed in a liquid solution of potassium choloride 16 or the like. An incapsulating thin film 18 is provided to form the body of the catheter-like probe. Film 18 is fabricated of a suitable hydrophobic material, such as polyethylene, which functions to block the passage of solid materials, as protein, while allowing the passage of gases, such as oxygen.

A pulse generator 20 of standard construction, is provided to deliver time varying voltage pulses of, preferably, square wave shape. To vary the amplitude of the pulses emanating from generator 20 a potentiometer 22 is provided, driven by motor 24. A high quality single turn carbon potentiometer without stop has been found to be satisfactory. These have almost infinite resolution and produce much less noise (when the rotor is moved) than wire wound potentiometers. The potentiometer rotor 26 is connected to the large area unpolarized electrode 14 via line 28.

A cathode ray oscilloscope or other suitable indicating device 30 functions to give a visual indication of the magnitude of the currents and voltages appearing across the electrodes. To this end, the voltage at the electrode is applied to terminals 31 and 33, leading to (after internal amplification) the horizontal deflector plates of the oscilloscope via lines 32 and 34, whereas the current at the electrodes is measured as a voltage drop from line 36 across series resistor 38 (which is small compared to the electrode resistance) and applied via lines 40 and 42 to terminals 44 and 46 of the oscilloscope which lead (after internal amplification) to the vertical deflector plates thereof.

In the operation of the apparatus shown in FIGURE 1, the catheter-like probe 10 is adapted to be inserted through the skin into the biological fluid of the body. Since the film 18 is hydrophobic, only gasses from the fluid will diffuse therethrough to the liquid 16 until an equilibrium condition is established. At which time the oxygen concentration in liquid 16 is essentially equal to the unknown oxygen concentration of the body fluid. Generator 20 then applies pulses, preferably square wave pulses, of constant amplitude, say about 1½ volts to the motor-driven potentiometer 22 which applies a train of pulses of controllable duration and repetition rate and slowly increasing or decreasing amplitude to the electrodes 12 and 14. Typical pulse values for tests in biological fluids are 0.01 second pulse duration and 0.10 second intervals between pulses at ten seconds per revolution of the potentiometer.

Figure 2:
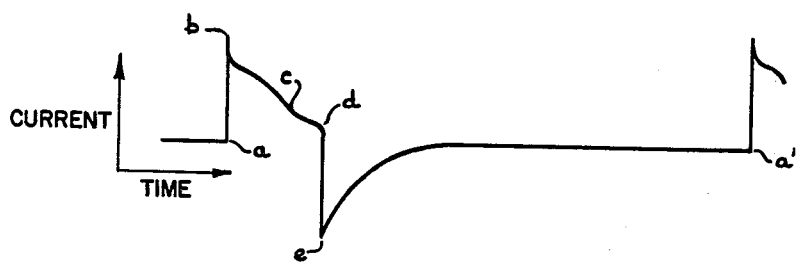
FIGURE 2 is a single pulse response plot of current as a function of time as applied to the apparatus of FIGURE 1.

FIGURE 2 shows the current response as a function of time for a single square wave pulse. It will be observed that the height of the leading edge $a$–$b$ is proportional to the applied voltage and represents the resistance of the solution lead wires, generator resistance and very little barrier potential at the electrodes. The section $b$–$c$ represents a time history of the polarization of electrode 12. Section $c$–$d$ shows that the current becomes inversely proportional to the square root of time after point $c$ until it is interrupted at $d$ by the end of the pulse. The pulse width is chosen such that point $d$ is late enough to permit polarization of electrode 12, but early enough to give moderate current values. It is also desirable that point $d$ be as early as possible to avoid excessive consumption of the oxygen, or other current carrying particles. It is to be noted that point $e$ is below point $a$, indicating the electrode and solution have become a tiny charged cell. Therefore, adequate time must be allowed between pulses to allow for substantially complete recovery, so that points $a$ and $a'$ are at the same height.

Figure 3:
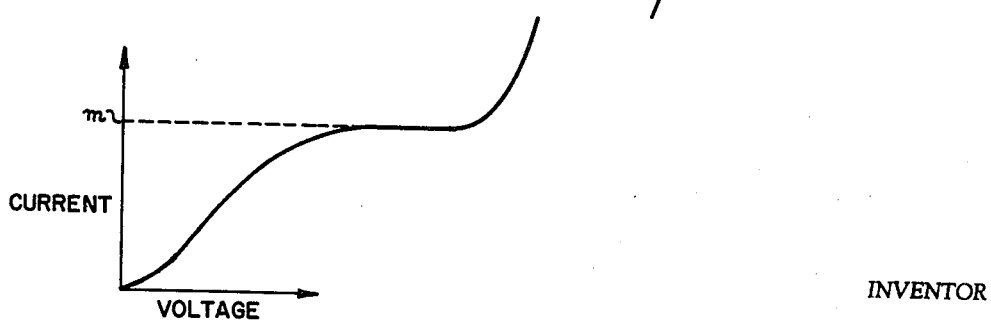
FIGURE 3 is a plot of current as a function of voltage in response to a plurality of pulses.

In FIGURE 3, the curve shown is a plot of the envelope of points $d$ of FIGURE 2 as the pulses become larger as the rotor 26 of potentiometer moves to increase the amplitude of the pulses. As should be apparent, the curve of FIGURE 3 represents a characteristic current-voltage polarograph wherein the value of the limiting current at point $m$ is indicative of the concentration of the oxygen in solution, as would be displayed on the oscilloscope of FIGURE 1. For a more detailed discussion of characteristic curves and the theory of polarography, reference may be had to standard texts on the subject, as for eaxmple, Polarography by Kolthoff and Lingane, Interscience Publishers.

It will be appreciated that the characteristic curve of FIGURE 3 has been obtained without the over-consumption of oxygen and without the inaccuracies resulting from failure to establish equilibrium across the hydrophobic film, that would otherwise obtain if the voltage was gradually increased in a continuous mode as opposed to the pulsed technique of the present invention.

Other modifications will occur to those skilled in the art without departing from the spirit of the present invention. It is therefore intended that the invention is to be limited only by the scope of the appended claims.

I claim:
1. Apparatus for analysing substances dissolved in a liquid, comprising in combination:
 (a) a pair of microelectrodes,
 (b) a film of hydrophobic material incapsulating said microelectrodes,
 (c) pulse generating means, and
 (d) means applying the output of said pulse generating means to said microelectrode means.
2. The apparatus according to claim 1, wherein:
 (e) said last mentioned means includes means for progressively varying the amplitude of the pulses applied to said microelectrode means.
3. The apparatus according to claim 2, further comprising:
 (f) means for indicting the current passing through said microelectrodes in response to the pulses applied thereto.
4. The apparatus according to claim 1, wherein:
 (e) said last mentioned means includes means for progressively increasing the amplitude of the pulses applied to said microelectrodes.
5. The apparatus according to claim 4, wherein:
 (g) the ratio of pulse interval to pulse duration is at least substantially ten to one.
6. The apparatus according to claim 4, wherein:
 (g) said microelectrodes comprise a polarizable and an unpolarizable electrode immersed in a liquid solution.
7. The apparatus according to claim 8, wherein:
 (h) said polarizable electrode is fabricated from platinum,
 (i) said unpolarizable electrode is silver-silver chloride, and
 (j) said solution is potassium chloride.
8. The apparatus according to claim 1, wherein:
 (e) said last mentioned means includes means for progressively decreasing the amplitude of the pulses applied to said microelectrodes.

References Cited

UNITED STATES PATENTS

| 3,098,813 | 7/1963 | Beebe et al. | 204—195 |
| 3,242,064 | 3/1966 | Byrne | 204—196 |

T. TUNG, Primary Examiner

U.S. Cl. X.R.

204—1